United States Patent [19]

Goan

[11] 4,216,262
[45] Aug. 5, 1980

[54] SURFACE TREATMENT OF CARBON FIBERS

[75] Inventor: John C. Goan, Johnson City, Tenn.

[73] Assignee: Great Lakes Carbon Corporation, New York, N.Y.

[21] Appl. No.: 41,703

[22] Filed: May 23, 1979

[51] Int. Cl.$^2$ .............................................. B32B 9/00
[52] U.S. Cl. .................................. 428/367; 427/299; 427/394; 427/412; 427/444; 428/375; 427/434.6
[58] Field of Search ................... 427/394, 434 D, 444, 427/299, 407 R, 412; 428/367, 394, 378, 375, 392; 521/171

[56] References Cited

U.S. PATENT DOCUMENTS

| | | | |
|---|---|---|---|
| 3,806,489 | 4/1974 | Rieux | 260/38 |
| 3,837,904 | 9/1974 | Hill | 427/386 |
| 3,914,504 | 10/1975 | Weldy | 428/367 |
| 3,957,716 | 5/1976 | Weldy | 260/37 EP |
| 4,007,079 | 2/1977 | Turley | 156/330 |
| 4,007,160 | 2/1977 | Turley | 260/47 EC |
| 4,145,472 | 3/1979 | Spain | 428/367 |
| 4,163,003 | 7/1979 | Paul | 260/40 R |

Primary Examiner—Michael F. Esposito
Assistant Examiner—Janyce A. Bell
Attorney, Agent, or Firm—R. Laddie Taylor

[57] ABSTRACT

The compound 4,4,4-trichloro-1,2-epoxy butane is utilized as a coupling agent for carbon fibers and resin matrix material in the production of carbon fiber reinforced composites to enhance the bonding characteristics of the fiber and resin while improving the flexural strength of the final composite structure.

4 Claims, No Drawings

SURFACE TREATMENT OF CARBON FIBERS

BACKGROUND OF THE INVENTION

1. Field of the Invention

The invention relates to composite structures comprised of carbon fibers and a resin matrix and a means for enhancing the bonding characteristics of the fiber and resin while improving the flexural strength of such composites. The term carbon fibers is used herein in the generic sense and include both graphite fibers and amorphous carbon fibers in filament, tow, staple yarn or roving configuration.

2. Description of the Prior Art

Carbon fiber/resin matrix composite structures often exhibit low inerlaminar composite shear strengths, which is a measure of interfacial bonding between the fibers and the resin, because of relatively poor adhesion between the fibers and the matrix.

In the past, improved bonding has been accomplished by coating the surfaces of the fibers with various metals (e.g., tantalum), metal carbides (e.g., whiskers of silicon carbide) and nitrides. These coating processes are inherently expensive and it is difficult to control the thickness and homogeneity thereof. Further, these coatings do not enhance the flexural strength of the final composite structure.

Additionally, various surface treatments known in the art have been applied to the fibers to improve their bonding characteristics. Such treatments, however, are conventionally oxidative or corrosive etches of various kinds, and include treatment with air, ozone, concentrated nitric acid, chromic-sulfuric acid, nitrogen dioxide and the like. Although these treatments do tend to improve composite shear strength, they proceed to the internal portions of the fibers and actually decrease other fiber and/or composite physical properties. Furthermore, surface treatments of this nature are expensive, relatively inconvenient to apply to the fibers, often pollute the atmosphere, and can be hazardous to the health of workers in the area where the treatment is taking place.

SUMMARY OF THE INVENTION

It is an object of the invention to provide a means for enhancing the bonding quality of carbon fibers with a resin matrix material.

It is a further object of the invention to provide a means for producing improved carbon fibers for use in composite structures, which structures have superior primary structural properties.

It is a further object of the invention to provide a means for improving the shear strength of carbon fiber-resin composite structures while improving the flexural strength of such composites.

These and other objects of the invention for improving the bonding characteristics of carbon fibers with a resin matrix material are achieved by employing a method which comprises applying to the surface of said fibers an effective amount of a coating material consisting essentially of 4,4,4-trichloro-1,2-epoxy butane, preferably in an amount of at least about 0.1 wt.%, and ideally in an amount in the range of about 0.1 wt.% to about 3.0 wt.%, based on the weight of the uncoated fibers.

The compound 4,4,4-trichloro-1,2-epoxy butane, also known in the art as trichlorobutylene oxide and referred to hereinafter as TCBO, has the structure

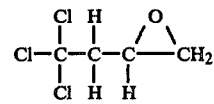

and may be obtained from Olin chemicals, Stamford, Connecticut. This compound is described in Olin Chemicals bulletins 754-014R (Product Data) and 754-018 (Applications Data).

DETAILED DESCRIPTION OF THE INVENTION

High modulus carbon fibers useful for this invention are those fibers possessing a tensile strength greater than $100 \times 10^3$ psi and a Young's modulus above $20 \times 10^6$ psi, and are typically acrylic-based. Such fibers can be prepared, for example, by the method of Shindo, "Studies in Graphite Fiber Report No. 317 of the Government Research Industrial Institute," Osaka, Japan 1961, and Johnson et al., U.S. Pat. No. 3,412,062. Typically, acrylic fibers can be stretched to about 50 to 100 percent or more of their original length while heating in the presence of water or steam to about 100° C., oxidized in an oxidizing atmosphere at about 200° C. to 300° C. for a period of up to 4 hours, oxidized in a second stage in an oxidative atmosphere at 200° C. to 375° C. and pyrolyzed and/or graphitized at 1,000° C. to 3,000° C. in a nonoxidizing atmosphere to prepare a carbon fiber possessing a high modulus of elasticity and a high tensile strength.

Although it has been found that the invention is particularly effective for improving the bonding characteristics of carbon fibers and an epoxy resin matrix, the concept is equally valid for any resin matrix containing an active hydrogen capable of reacting with the very reactive oxirane ring of TCBO.

The method for coating the carbon fibers with TCBO preferably comprises applying it as a solution in a suitable solvent and then evaporating the solvent from the coated fibers. The presence of the solvent improves the penetrability of the TCBO onto the individual fibers of a tow, staple yarn or roving. Preferred solvents are toluene, carbon tetrachloride, cyclohexane, xylene and the like.

Although it is preferred that the TCBO coating be applied to carbon fibers without prior surface modification, it is within the scope of the invention to apply the coating to fibers having a surface modified or treated according to methods known in the art as discussed above.

DESCRIPTION OF THE PREFERRED EMBODIMENT

The preferred embodiment of the invention will now be presented by the following non-limiting example.

A 6.1 gram sample of FORTAFIL ®3(U) graphite fiber tow, a nonsurface-treated fiber produced by Great Lakes Carbon Corporation, was immersed in a solution of 2% TCBO (Olin Chemicals) in toluene (Fisher Scientific Co.). The tow bundle was removed from the solution and allowed to dry at room temperature for 16 hours to evaporate the solvent. TCBO pick-up by the fibers was observed to be approximately 1 wt.%, based on the weight of the uncoated fibers.

The effect of the TCBO coating on fiber-resin adhesion was evaluated by incorporating the fibers in an amount of 60 percent by volume in a resin, curing the resin by well-known procedures to give high strength composite samples, then measuring the pertinent physical properties of the composite. Specifically, test bars were prepared by combining 2.54 grams of the coated graphite fiber tow with an epoxy resin system consisting of 100 parts by weight of EPON 826 epoxy resin (Shell Chemical Co.) and 14 parts by weight of meta-phenylene diamine (Miller-Stephenson Chemical Co.). The resin was used in excess because some of it was forced out of the mold during the subsequent curing operation. The impregnated fiber tows were laid in the cavities of a multiposition mold so designed that the final dimensions of the molded specimens would be 8"×0.25"×0.060" and the fiber would occupy 60 percent by volume of the specimen. The mold containing the resin-impregnated fiber was placed in a vacuum chamber which was then evacuated to a pressure of 5 millimeters of mercury, and then positioned in a heated platen press and cured under a combination of heat and mold pressure using conditions well known in the art, viz, a pressure of 300 psig and a temperature of 150° C. for 2 hours.

The cured composite specimens were tested for flexural strength and interlaminar shear strength by standard ASTM procedures also well known in the art. For the flexural strength determination, the 0.060" thick sample was loaded in a three point configuration on a 2 inch span (the support and loading surface being the radial faces of 0.5 inch diameter steel pins) giving a span to depth ratio of 33.3 to 1. Stress was applied until failure, giving a linear stress-strain curve from which the ultimate flexural strength was calculated. For the determination of interlaminar shear strength, a second sample of composite was loaded in a three-point configuration on 0.25" inch centers consisting of the radial surfaces of 0.25 inch diameter steel pins, providing a span to depth ratio of 4.2 to 1. The bar was stressed to failure, the magnitude of the force required being used to compute the interlaminar shear strength.

Test specimens containing fiber coated with TCBO and also containing an uncoated sample of the same fiber batch were made and evaluated by the above procedure. The test results obtained are shown below.

| | Composite Properties | |
|---|---|---|
| Fiber Description | Interlaminar Shear Strength | Flexural Strength |
| Uncoated | 10,500 psi | 225,000 psi |
| Coated with TCBO | 12,700 psi | 238,000 psi |

These improvements in both interlaminar shear strength and flexural strength demonstrate the improved fiber to resin adhesion. The shear strength improvement shown, which is more than 20%, is about equal to that afforded by an etching surface treatment of this type of fiber. As pointed out hereinabove, such etching of the fibers conventionally decreases the flexural strength of a composite formed therefrom.

While the invention has been described in detail and with reference to a specific embodiment thereof, it will be apparent to one skilled in the art that various changes and modifications can be made therein without departing from the scope and spirit thereof, and, therefore, the invention is not intended to be limited except as indicated in the appended claims.

What is claimed is:

1. A method for improving the bonding characteristics of carbon fibers with a resin matrix material which comprises applying to the surface of said fibers an effective amount of a coating composition consisting essentially of 4,4,4-trichloro-1,2-epoxy butane.

2. The method of claim 1 wherein the coating is applied in an amount in the range of about 0.1 wt.% to about 3.0 wt.%, based on the weight of the uncoated fibers.

3. The method of claims 1 or 2 wherein the resin matrix is epoxy resin.

4. A method for improving the bonding characteristics of carbon fibers with an epoxy resin which comprises applying to the surface of said fibers a coating composition consisting essentially of 4,4,4-trichloro-1,2-epoxy butane in an amount of about 1.0 wt.%, based on the weight of the uncoated fibers.

* * * * *